US011599335B2

(12) United States Patent
Lee et al.

(10) Patent No.: US 11,599,335 B2
(45) Date of Patent: Mar. 7, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Jihye Lee, Hwaseong-si (KR); Kyuhwan Chin, Seoul (KR); Dong June Song, Anyang-si (KR); Jaekwon Jung, Yongin-si (KR); Yongho Shin, Anyang-si (KR); Sinjung Kim, Suwon-si (KR); Beom Choon Park, Hwaseong-si (KR); SeokHan Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 745 days.

(21) Appl. No.: 16/591,340

(22) Filed: Oct. 2, 2019

(65) Prior Publication Data
US 2020/0167129 A1 May 28, 2020

(30) Foreign Application Priority Data
Nov. 22, 2018 (KR) .................. 10-2018-0145283

(51) Int. Cl.
*H04L 29/06* (2006.01)
*G06F 7/58* (2006.01)
*H04L 9/08* (2006.01)
*H04L 9/06* (2006.01)
*G07C 9/00* (2020.01)
(Continued)

(52) U.S. Cl.
CPC ............ *G06F 7/582* (2013.01); *B60R 25/248* (2013.01); *G07C 9/00309* (2013.01); *H04L 9/0643* (2013.01); *H04L 9/0869* (2013.01); *H04L 9/3239* (2013.01); *G07C 2009/00507* (2013.01)

(58) Field of Classification Search
CPC .......... G06F 7/582; G07C 2009/00507; G07C 9/00309; B60R 25/248; H04L 9/0643; H04L 9/0869; H04L 9/3239
USPC ....................................... 708/250
See application file for complete search history.

(56) References Cited

U.S. PATENT DOCUMENTS

2012/0253607 A1    10/2012   Choi
2015/0143125 A1 *  5/2015    Nix ..................... H04L 12/2854
                                                        713/171
2016/0236653 A1 *  8/2016    Katou ................. H04W 12/041

FOREIGN PATENT DOCUMENTS

EP         2743868 A1 *  6/2014    ............. G06Q 10/02
JP         2016-050409 A    4/2016
KR     10-2015-0109202 A    10/2015
(Continued)

*Primary Examiner* — Evans Desrosiers
(74) *Attorney, Agent, or Firm* — Fox Rothschild LLP

(57) ABSTRACT

A vehicle includes: at least one memory configured to store at least one default Instruction Structure Key (ISK), a generated ISK, and a pin code of the vehicle; and at least one processor. The at least one default ISK may include a first default ISK and a second default ISK. The processor may generate a random number using the first default ISK, receive the second default ISK encrypted with the generated ISK generated based on the pin code, and determine the generated ISK as an encryption key for encryption communication of the vehicle when the generated random number and the random number corresponding to the second default ISK are the same.

12 Claims, 8 Drawing Sheets

(51) Int. Cl.
  *B60R 25/24* (2013.01)
  *H04L 9/32* (2006.01)

(56) References Cited

FOREIGN PATENT DOCUMENTS

| KR | 10-1757214 B1 | 7/2017 |
| KR | 10-2017-0138265 A | 12/2017 |
| KR | 10-2018-0044768 A | 5/2018 |

* cited by examiner

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2018-0145283, filed on Nov. 22, 2018 in the Korean Intellectual Property Office, the disclosure of which is incorporated by reference in its entirety.

TECHNICAL FIELD

Embodiments of the disclosure relate to a vehicle and a method of controlling the vehicle, and more particularly, to a vehicle capable of providing encryption communication for entry and starting of the vehicle, and a method of controlling the vehicle.

BACKGROUND

Current vehicles are manufactured with various electronic control units (ECUs) for controlling entry or starting of the vehicle as well as an electronic control for a driving system. At this time, a typical example of the ECU is an Integrated Body Control Unit (IBU), and the IBU may communicate with a Smart Key System (SMK).

On the other hand, the IBU mainly uses a Controller Area Network (CAN) communication method as the method for communicating with the SMK. At this time, when data to be transmitted and received is exposed to the outside, a serious problem arises in security.

The disclosure of this section is to provide background of the invention. Applicant notes that this section may contain information available before this application. However, by providing this section, Applicant does not admit that any information contained in this section constitutes prior art.

SUMMARY

Therefore, aspects of the invention provide a vehicle capable of providing an algorithm for preventing encrypted data transmitted and received in the vehicle from being exposed to the outside, and a method of controlling the vehicle.

Aspects of the invention further provide a vehicle capable of controlling power consumption of electronic components using in-vehicle communication in response to a shortage of momentary power supply, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle that performs encryption communication, the vehicle including: at least one memory configured to store at least one default Instruction Structure Key (ISK), a generated ISK, and a pin code of the vehicle; and at least one processor. The at least one default ISK may include a first default ISK and a second default ISK. The processor may generate a random number using the first default ISK, receive the second default ISK encrypted with the generated ISK generated based on the pin code, and when the generated random number and a random number corresponding to the second default ISK are the same, determine the generated ISK as an encryption key for encryption communication of the vehicle.

The generated ISK may be generated by hashing the pin code of the vehicle to Secure Hash Algorithm (SHA) 256.

The at least one processor may include a first processor and a second processor. The first processor may receive a number A that is the random number generated by the second processor, generate the generated ISK based on the number A, and when the received number A and the random number corresponding to the generated ISK are the same, determine the generated ISK as a code for temporary use. The second processor may receive a number B that is the random number generated by the first processor, generate 16 bytes based on the number B, and when the received number B and the random number corresponding to the 16 bytes are the same, determine the generated ISK as a code for the encryption communication of the vehicle.

The random number corresponding to the generated ISK may be the random number corresponding to the default ISK encrypted with the generated ISK generated based on the pin code.

The 16 bytes may be values obtained by successively arranging 4 lower bytes of the number B.

When the received number A and the random number corresponding to the generated ISK are not the same, the first processor may restore the generated ISK to a previous value.

When the received number B and the random number corresponding to the 16 bytes are not the same, the second processor may restore the generated ISK to a previous value.

In accordance with another aspect of the disclosure, a method of controlling a vehicle may perform encryption communication using at least one default Instruction Structure Key (ISK), a generated ISK, and a pin code. The at least one default ISK may include a first default ISK and a second default ISK. The method includes: generating a random number using the first default ISK; receiving the second default ISK encrypted with the generated ISK generated based on the pin code; and when the generated random number and the random number corresponding to the second default ISK are the same, determining the generated ISK as an encryption key for the encryption communication of the vehicle.

The generated ISK may be generated by hashing the pin code of the vehicle to Secure Hash Algorithm (SHA) 256.

The determining of the generated ISK as a code for the encryption communication of the vehicle may include generating a number A that is the random number; generating the generated ISK based on the number A; when the generated number A and the random number corresponding to the generated ISK are the same, determining the generated ISK as the code for temporary use; generating a number B that is the random number; generating 16 bytes based on the number B; and determining the generated ISK as the code for the encryption communication of the vehicle when the generated number B and the random number corresponding to the 16 bytes are the same.

The random number corresponding to the generated ISK may be the random number corresponding to the default ISK encrypted with the generated ISK generated based on the pin code.

The 16 bytes may be values obtained by successively arranging 4 lower bytes of the number B.

The determining of the generated ISK as the code for temporary use may include restoring the generated ISK to a previous value when the generated number A and the random number corresponding to the generated ISK are not the same.

The determining of the generated ISK as the code for the encryption communication of the vehicle may include restoring the generated ISK to a previous value when the generated number B and the random number corresponding to the 16 bytes are not the same.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
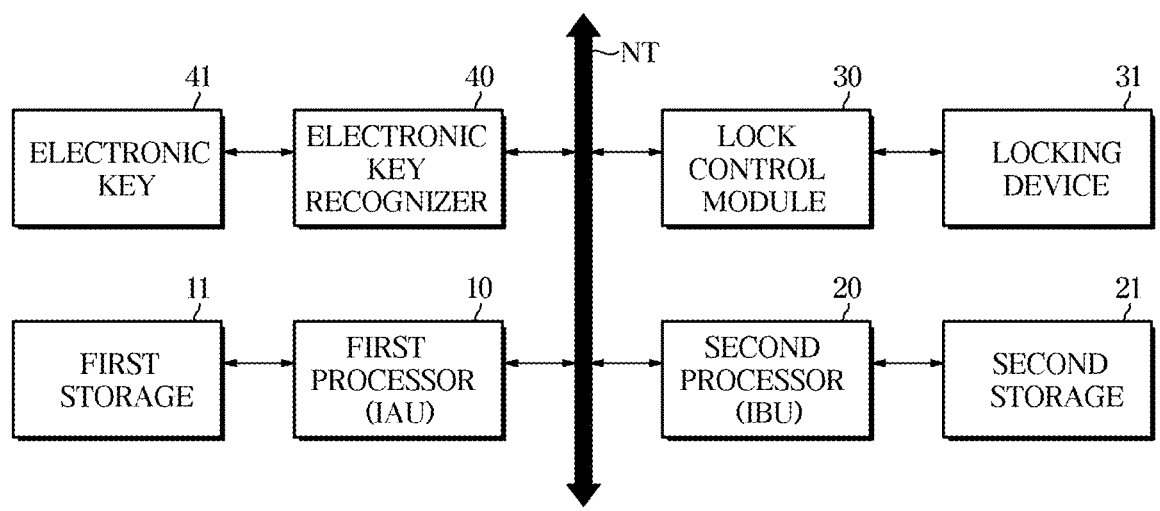
FIG. 1 is a view illustrating a configuration of a vehicle according to embodiments of the disclosure.

Like reference numerals refer to like elements throughout the specification. Not all elements of embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Prior to the description of the specification, some terms used in the specification will be clarified.

In the specification, an encryption key is a security means that is provided in correspondence with a vehicle identification number of a vehicle, which can be issued before and after the learning according to embodiments described below, and which can be stored in a memory. For example, the vehicle identification number is a value obtained by converting a vehicle number into a PIN code corresponding to a binary code, and is uniquely assigned to the vehicle and can be used as identification information of the vehicle. The encryption key may correspond to an Instruction Structure Key (ISK), but the disclosure is not limited thereto. The encryption key may be included in any data that can be exchanged by a processor installed in the vehicle.

For example, the encryption key is the ISK, and a key length of the Advanced Encryption Standard (AES) can be adopted as at least one of 128 bits (16 bytes), 192 bits (24 bytes), and 256 bits (32 bytes).

Meanwhile, the encryption key may include a default ISK and a generated ISK. In embodiments, the default ISK may indicate an ISK value basically determined when the vehicle is first produced. In embodiments, the default ISK may refer to the ISK value before the learning, and is different for each vehicle, but has the same initial value between an Identity Authentication Unit (IAU) and an Integrated Body Control Unit (IBU) of one vehicle.

The generated ISK may indicate the ISK value generated by the learning according to embodiments described below. This corresponds to the ISK value generated by the IAU's unique generation algorithm.

A random number may refer to data obtained by converting the default ISK or the generated ISK having a 16 bytes value to an arbitrary value having 6 bytes.

Hereinafter, the operation principles and embodiments of the disclosure will be described with reference to the accompanying drawings.

FIG. 1 is a view illustrating a configuration of an apparatus of a vehicle according to embodiments of the disclosure for providing encrypted communication.

As illustrated in FIG. 1, in embodiments, the vehicle may include a first processor 10, a second processor 20, a lock control module 30, and an electronic key recognizer 40. A first storage 11 and a second storage 21 may be connected to the first processor 10 and the second processor 20, respectively, to store data related to encryption generated and converted.

The first processor 10 and the second processor 20 may correspond to a control device for the vehicle to perform encryption communication. It is noted that each of the first processor 10 and the second processor 20 may perform the functions and operations of the IAU and the IBU and may perform the opposite roles. For example, the first processor 10 may correspond to a control device newly added for controlling (door lock or door release, starting on or starting off) the vehicle to which an entry or starting system using fingerprint authentication is applied. The second processor 20 may correspond to a control device for performing communication with an electronic key system.

In embodiments, the electronic key system may include the electronic key recognizer 40 and an electronic key 41. The electronic key 41 may refer to a signal generating device that can generate frequency signals of various bands in order to perform bidirectional communication with the electronic key recognizer 40 provided in the vehicle. For example, the electronic key 41 may be a smart key that can control a remote key system of the vehicle.

When a driver holding the electronic key 41 is located around the vehicle, the electronic key recognizer 40 may determine whether a unique ID built in the electronic key 41 matches ID information stored in the electronic key recognizer 40 to confirm whether the electronic key 41 is authenticated. Then, the electronic key recognizer 40 may transmit a signal to the lock control module 30 that allows a locking device 31 of the vehicle to enter an unlocked state. Further, when the electronic key recognizer 40 determines that the electronic key 41 is not authenticated within a certain radius range with respect to the vehicle, the electronic key recognizer 40 may transmit a signal to the lock control module 30 that allows the locking device 31 of the vehicle to enter a locked state.

Communication contents between the first processor 10 and the second processor 20 is an authentication result of the electronic key 41, and whether the electronic key 41 is in the interior of the vehicle. Here, when the communication contents exchanged with each other are exposed to the outside in the form of raw data, hacking by an outsider is facilitated, thereby causing a problem in a security system of the vehicle. Therefore, in embodiments, the encryption communication is performed with a new type of data, rather than the form of the raw data. Here, the new type of data may correspond to the encryption key described below.

The above-described encryption key may be determined through a learning process between the first processor 10 and the second processor 20 in order to be used for the encryption communication of the vehicle. In addition, the first processor 10 may transmit the result of authentication success or failure to the second processor 20 as encrypted data, and the second processor 20 may transmit the search result of the electronic key 41 in the vehicle to the first processor 10 as the encrypted data. It should be noted, however, that the above-described process does not necessarily involve a signal transmission for the response of the first processor 10.

In embodiments, the vehicle may be implemented with a memory storing an algorithm to control the operation of the components in the vehicle or data about a program that implements the algorithm, and a processor carrying out the aforementioned operation using the data stored in the memory. The memory and the processor may be implemented in separate chips. Alternatively, the memory and the processor may be implemented in a single chip.

The first storage 11 and the second storage 21 may be the memory implemented as the separate chips from the processor, and may be implemented as the single chip with the processor.

The electronic components may communicate with each other through a vehicle communication network NT. For example, the electronic components may transmit and receive data through Ethernet, Media Oriented Systems Transport (MOST), Flexray, Controller Area Network (CAN), Local Interconnect Network (LIN), and the like.

Figure 2:
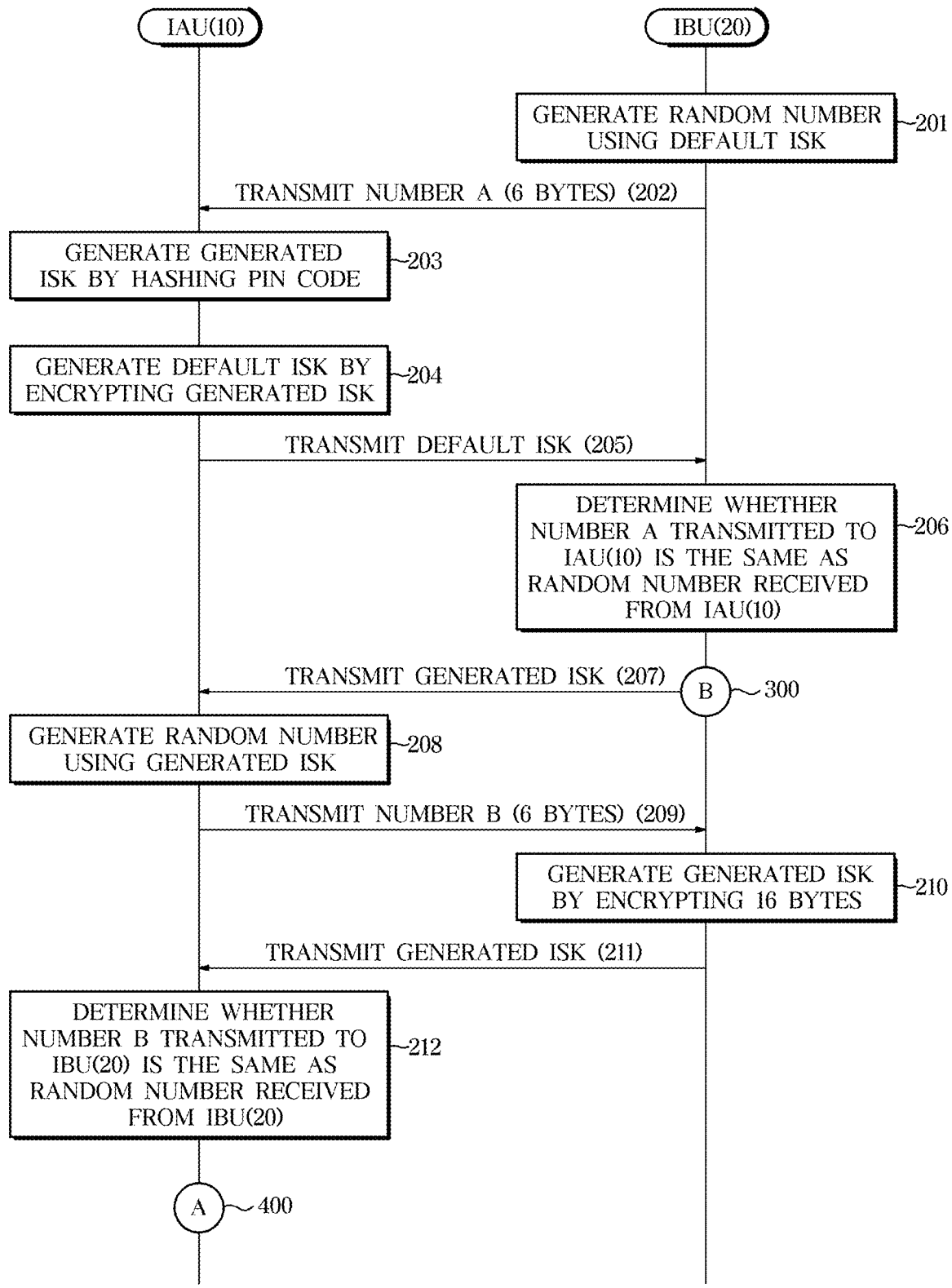
FIG. 2 is a flowchart illustrating a method of controlling a vehicle according to embodiments of the disclosure.
Figure 3:
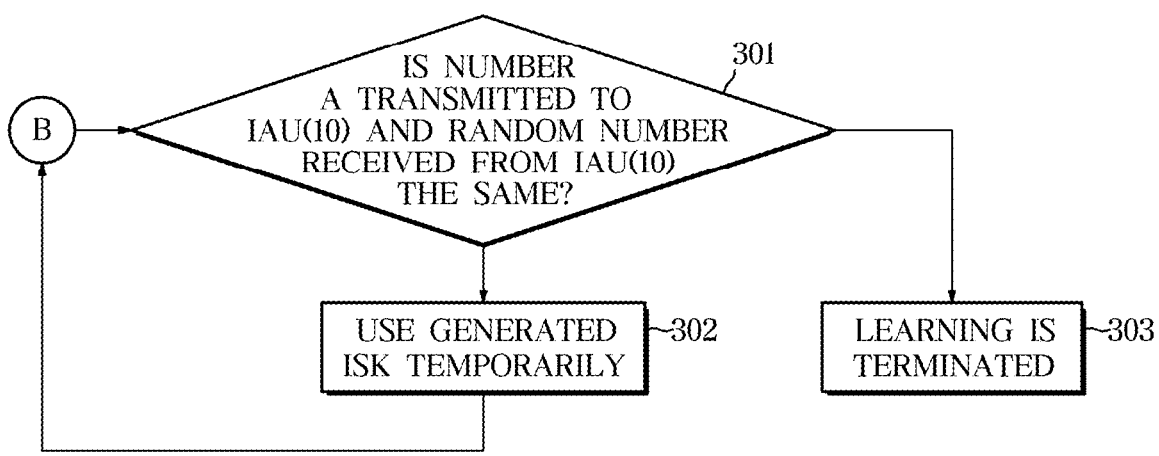
FIGS. 3 and 4 are flowcharts for describing the flowchart of FIG. 2 in more detail.
Figure 4:
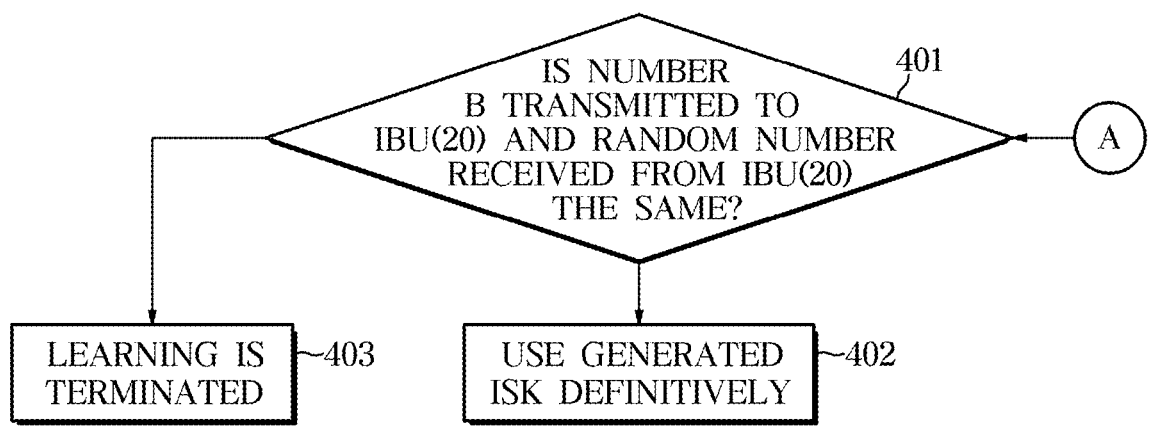

FIG. 2 is a flowchart illustrating a method of controlling a vehicle according to embodiments of the disclosure, and FIGS. 3 and 4 are flowcharts for describing the flowchart of FIG. 2 in more detail. However, it should be understood that these are examples and some of the operations may be added or omitted if desired.

An IAU 10 may generate the ISK using a pin code stored in the vehicle. The generated ISK may be the default ISK, and the IAU 10 and an IBU 20 may initially retain the same default ISKs. Here, the ISK may refer to a key value for performing an encryption and decryption process according to AES 128, which is an encryption standard method. In embodiments, the pin code may also refer to an arrangement of letters and numbers that a manufacturer inputs to the vehicle at the time the vehicle was initially produced.

The IAU 10 may receive a command for starting the learning from a diagnostic device (e.g., On-board Diagnostics (OBD) module) of the vehicle and request the IBU 20 to start the learning. In embodiments, the IBU 20 may generate a random number using the default ISK (201). For example, the generated random number may be a number A, and may be the encrypted data of 6 bytes. Next, the IBU 20 may transmit the generated number A to the IAU 10 (202).

The IAU 10 may generate the generated ISK by hashing the pin code (203), and encrypt the generated ISK to generate the default ISK (204). Here, the generated default ISK may be the same as or different from the initially held default ISK. Then, the generated default ISK may be transmitted to the IBU 20 (205).

When receiving the generated default ISK, the IBU 20 may determine whether the number A transmitted to the IAU 10 is the same as the random number received from the IAU 10 (206). The IBU 20 may determine whether the received random number is the same as the number A transmitted to the IAU 10 by performing the decryption process. In embodiments, the random number received from the IAU 10 may be the encrypted data obtained by converting the generated default ISK to 6 bytes.

Referring to FIG. 3, when the number A transmitted to the IAU 10 and the random number received from the IAU 10 are the same (301), the IBU 20 may temporarily store the generated ISK and use the generated ISK as data for determining the encryption key in a next process (302). Thus, the learning process for determining the encryption key may continue.

Alternatively, when the number A transmitted to the IAU 10 is different from the random number received from the IAU (301), the IBU 20 may terminate the learning for confirming the encryption key, and restore all newly generated ISK values to the initial values in the above-described process (303).

In the above, the process of preliminarily determining the ISK for the encryption key has been described. On the other hand, the process of deterministically determining the ISK for the encryption key is described below.

The IAU 10 generates the random number using the generated ISK provided at the IBU 20 (208). Here, the generated random number may be a number B and may be the encrypted data of 6 bytes. Next, the IAU 10 may transmit the generated number B to the IBU 20 (209).

The IBU 20 may encrypt 16 bytes to generate the generated ISK (210). In addition, the IBU 20 may generate the generated ISK by encrypting the number B and 16 bytes, e.g., a 16 byte string. Next, the IBU 20 may transmit the generated ISK generated in the present process to the IAU 10 (211). Here, the 16 bytes may correspond to the values in which 4 lower bytes of the random number (6 bytes) are successively arranged.

When the generated ISK is received, the IAU 10 may determine whether the number B transmitted to the IBU 20 is the same as the random number received from the IBU 20 (212). The IAU 10 may determine whether the number B transmitted to the IBU 20 is equal to the received random number received from the IBU 20 by performing the decryption process. Here, the random number received from the IBU 20 may be the encrypted data obtained by converting the generated ISK into 6 bytes.

Next, referring to FIG. 4, when the number B transmitted to the IBU 20 and the random number received from the IBU 20 are the same (401), the IAU 10 may terminate the learning for determining the encryption key and determine the generated ISK as the encryption key (402).

Otherwise, when the number B transmitted to the IBU 20 is different from the random number received from the IBU 20 (401), the IBU 20 may terminate the learning for confirming the encryption key, and restore all newly generated ISK values to the initial values in the above-described process (403).

According to embodiments, the processor or multiple processors may generate the random number using a first default ISK, and receive a second default ISK encrypted with the generated ISK generated based on the pin code. When the generated random number and the random number corresponding to the second default ISK are the same, the processor may determine the generated ISK as the encryption key for the encryption communication of the vehicle. In embodiments, there would be the first default ISK and the second default ISK, which may mean that the default ISK values in each of the IAU 10 and the IBU 20 are independent of each other.

According to another embodiment, the vehicle may include the first processor 10 and the second processor 20. Here, the first processor 10 may correspond to the IAU 10 and the second processor 20 may correspond to the IBU 20. In embodiments, the first processor 10 may receive the number A, which is the random number generated by the second processor 20, and generate the generated ISK based on the number A. When the received number A and the random number corresponding to the generated ISK are the same, the first processor 10 may determine a code that uses the generated ISK temporarily. The second processor 20 may receive the number B, which is the random number generated by the first processor 10, and generate 16 bytes based on the number B. When the received number B and the random number corresponding to the 16 bytes are the same, the second processor 20 may determine the generated ISK as a code for the encryption communication of the vehicle and use the code as the last generated ISK defined encryption key. According to the embodiments, by introducing a new authenticator, the encryption key with enhanced security may be used for the encryption communication of the vehicle.

In the above, the encryption key learning method between the IAU 10 and the IBU 20 has been described. In the following, a learning procedure related to the above-described encrypted data is performed and a method of transmitting the encrypted data by the IAU 10 and the IBU 20 will be described in detail.

Figure 5:
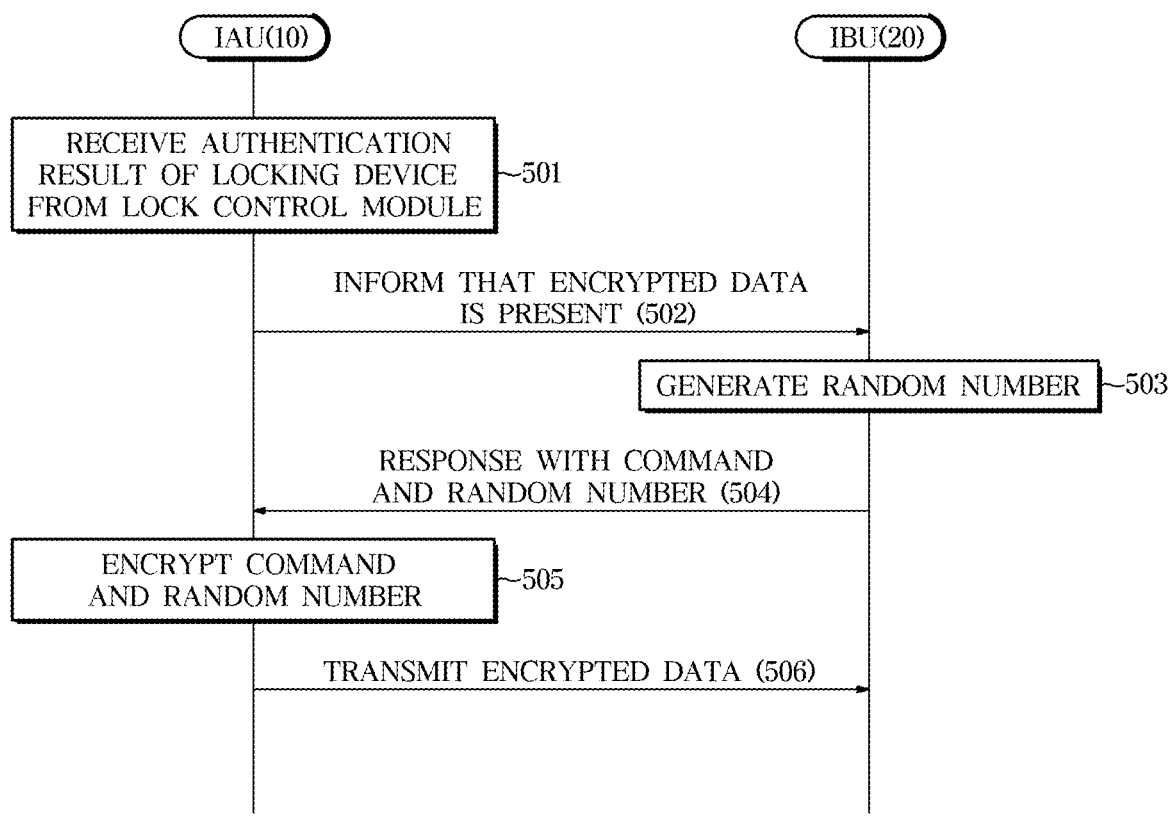
FIG. 5 is a flowchart illustrating a method of controlling a vehicle according to another embodiment of the disclosure.

FIG. 5 is a flowchart for describing a process of transmitting the encrypted data by the IAU 10. However, it should be understood that this is an example and some of the operations may be added or omitted if desired.

The IAU 10 may receive the authentication result of the locking device 31 from the lock control module 30 (501). For example, the authentication result is whether the door lock or door release of the vehicle has been performed or whether a power supply of the vehicle has been operated. Here, the ISK of the IAU 10 may be the value generated in the above-described encryption key learning process.

Figure 6:
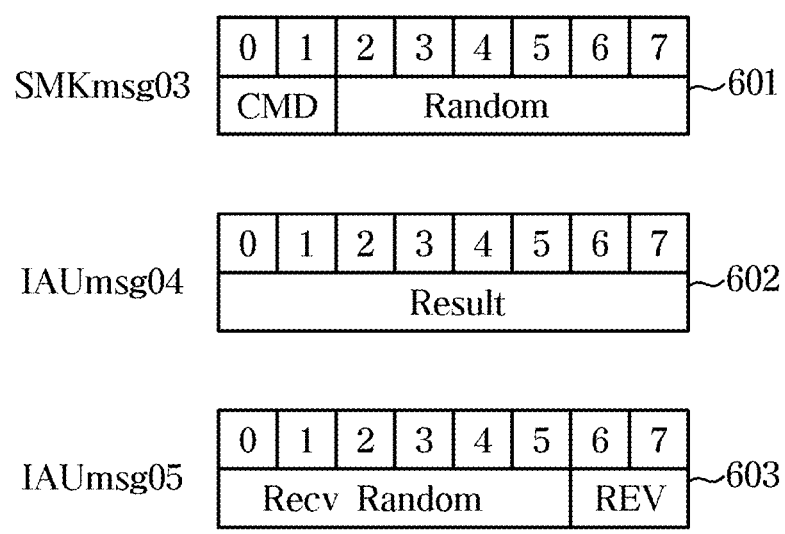
FIG. 6 is a view for describing a random number and a command that can be used in a process shown in FIG. 5.

Next, the IAU 10 may inform the IBU 20 that the encrypted data is present in a general data format (502), and in response, the IBU 20 may generate the random number (503), and receive the command and the random number (504). Referring to FIG. 6, a key structure of SMKmsg03 601 may be confirmed as an example of transmitted general data. Here, the command is a request value, and the random number may indicate an arbitrary random value.

The IAU 10 may encrypt the received command and the random number (505), and transmit the encrypted data to the IBU 20 (506). Referring to FIG. 6, a key structure of IAUmsg04 602 and IAUmsg05 603 may be confirmed as an example of decrypted data. Here, Result is a result value for the request, and Recv Random may indicate a random value received at the time of the request.

Finally, when receiving the encrypted data, the IBU 20 may decrypt the IAUmsg04 602 and the IAUmsg05 603, and confirm whether the transmitted random number and the received random number are the same. In embodiments, when it is determined that they are the same, the transmission is terminated. When it is determined that they are not the same, a request signal may be regenerated.

Figure 7:
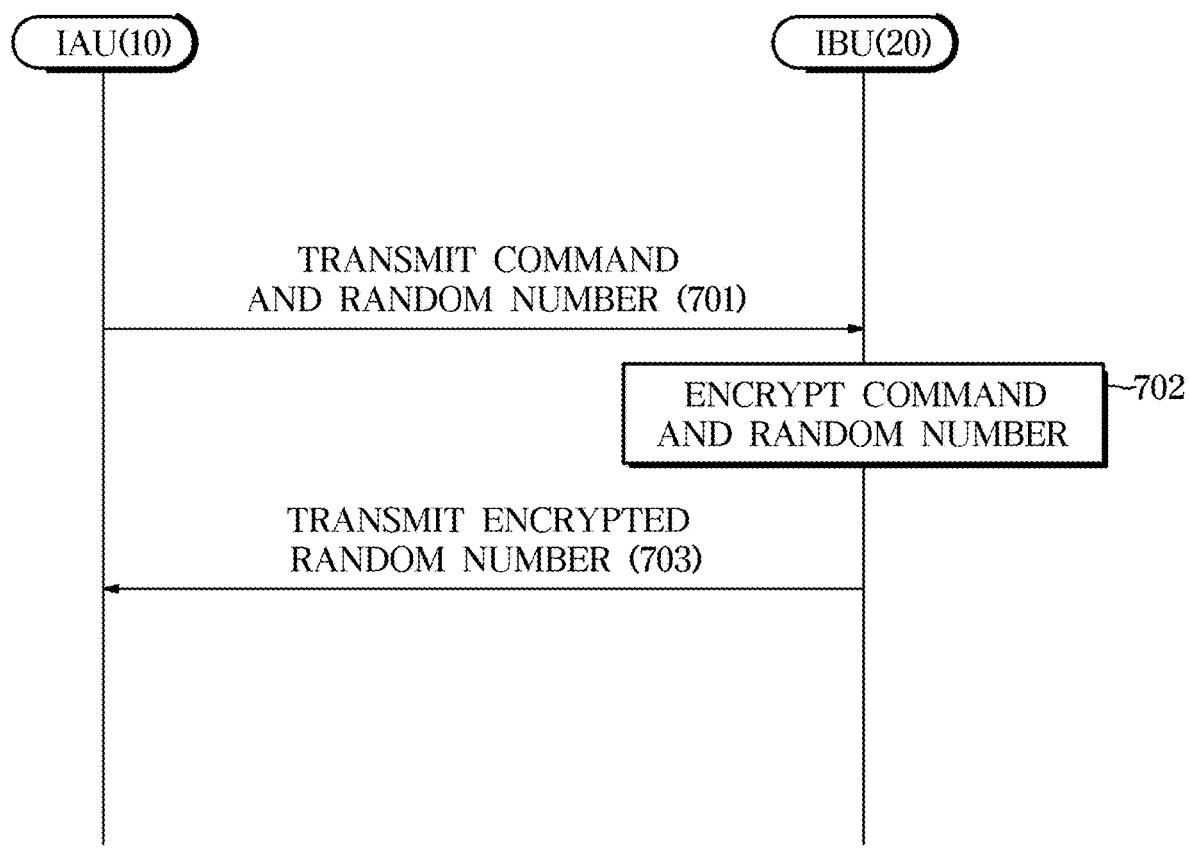
FIG. 7 is a flowchart illustrating a method of controlling a vehicle according to another embodiment of the disclosure.

FIG. 7 is a flowchart for describing a process of transmitting the encrypted data by the IBU 20. However, it should be understood that this is an example and some of the operations may be added or omitted if desired.

Figure 8:
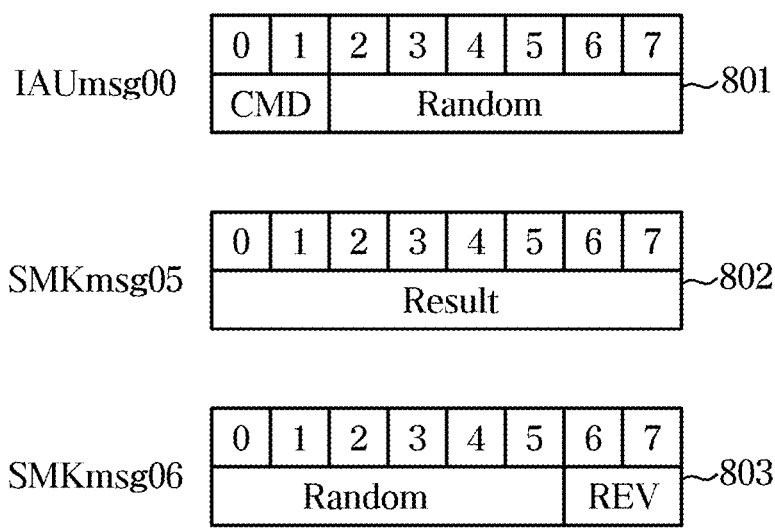
FIG. 8 is a view for describing a random number and a command that can be used in a process shown in FIG. 7.

When the IAU 10 receives the encrypted data from the IBU 20, the IAU 10 may transmit the command and the random number to the IBU 20 (701). Referring to FIG. 8, a key structure of IAUmsg00 801 may be confirmed as the example of data transmitted by the IAU 10.

The IBU 20 may encrypt the received command and the random number (702), and transmit the encrypted random number (703). For example, the IBU 20 may transmit the encrypted data based on the command and the random number received from the IAU 10. Referring to FIG. 8, a key structure of SMKmsg05 802 and SMKmsg06 803 may be confirmed as the example of the decrypted data. Here, Result is the result value for the request, and Random may indicate the random value received at the time of the request.

Finally, when receiving the encrypted data, the IAU 10 may decrypt the SMKmsg05 802 and the SMKmsg06 803, and confirm whether the transmitted random number and the received random number are the same. In embodiments, when it is determined that they are the same, the transmission is terminated. When it is determined that they are not the same, the request signal may be regenerated.

According to an aspect of the disclosure as described above, since the process of authenticating encrypted data is added by the newly introduced IAU and algorithm, the stability of a vehicle security system can be enhanced.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Logical blocks, modules or units described in connection with embodiments disclosed herein can be implemented or performed by a computing device having at least one processor, at least one memory and at least one communication interface.

The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Embodiments and examples of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
   at least one memory configured to store at least one default Instruction Structure Key (ISK), a generated ISK, and a pin code of the vehicle; and
   at least one processor,
   wherein the at least one default ISK comprises a first default ISK and a second default ISK, and
   wherein the at least one processor is configured to:
   generate a random number using the first default ISK;
   receive the second default ISK encrypted with the generated ISK generated based on the pin code; and
   when the generated random number and a random number corresponding to the second default ISK are the same, determine the generated ISK as an encryption key for encryption communication of the vehicle,
   wherein the at least one processor comprises a first processor and a second processor,
   wherein the first processor is configured to:
      receive a number A that is the random number generated by the second processor;
      generate the generated ISK based on the number A; and
      when the received number A and the random number corresponding to the generated ISK are the same, determine the generated ISK as a code for temporary use, and
   wherein the second processor is configured to:
      receive a number B that is the random number generated by the first processor;
      generate 16 bytes based on the number B; and
      when the received number B and the random number corresponding to the 16 bytes are the same, determine the generated ISK as a code for the encryption communication of the vehicle.

2. The vehicle according to claim 1, wherein the generated ISK is configured to be generated by hashing the pin code of the vehicle to Secure Hash Algorithm (SHA) 256.

3. The vehicle according to claim 1, wherein the random number corresponding to the generated ISK is the random number corresponding to the default ISK encrypted with the generated ISK generated based on the pin code.

4. The vehicle according to claim 1, wherein the 16 bytes are values obtained by successively arranging 4 lower bytes of the number B.

5. The vehicle according to claim 1, wherein, when the received number A and the random number corresponding to the generated ISK are not the same, the first processor is configured to restore the generated ISK to a previous value.

6. The vehicle according to claim 1, wherein, when the received number B and the random number corresponding to the 16 bytes are not the same, the second processor is configured to restore the generated ISK to a previous value.

7. A method of controlling a vehicle that performs encryption communication using at least one default Instruction Structure Key (ISK), a generated ISK, and a pin code, the method comprising:
   wherein the at least one default ISK comprises a first default ISK and a second default ISK, and
   generating a random number using the first default ISK;
   receiving the second default ISK encrypted with the generated ISK generated based on the pin code; and
   when the generated random number and a random number corresponding to the second default ISK are the same, determining the generated ISK as an encryption key for encryption communication of the vehicle,
   wherein the determining of the generated ISK as a code for the encryption communication of the vehicle comprises:
      generating a number A that is the random number;
      generating the generated ISK based on the number A;
      when the generated number A and the random number corresponding to the generated ISK are the same, determining the generated ISK as a code for temporary use;
      generating a number B that is a random number;
      generating 16 bytes based on the number B; and
      when the generated number B and the random number corresponding to the 16 bytes are the same, determining the generated ISK as the code for the encryption communication of the vehicle.

8. The method according to claim 7, wherein the generated ISK is configured to be generated by hashing the pin code of the vehicle to Secure Hash Algorithm (SHA) 256.

9. The method according to claim 7, wherein the random number corresponding to the generated ISK is the random number corresponding to the default ISK encrypted with the generated ISK generated based on the pin code.

10. The method according to claim 7, wherein the 16 bytes are values obtained by successively arranging 4 lower bytes of the number B.

11. The method according to claim 7, wherein the determining of the generated ISK as the code for temporary use comprises:
    when the generated number A and the random number corresponding to the generated ISK are not the same, restoring the generated ISK to a previous value.

12. The method according to claim 7, wherein the determining of the generated ISK as the code for the encryption communication of the vehicle comprises:
    when the generated number B and the random number corresponding to the 16 bytes are not the same, restoring the generated ISK to a previous value.

* * * * *